July 4, 1950
L. B. SCOTT
2,513,367
RADIANT ENERGY TRACKING APPARATUS
Filed May 26, 1948
2 Sheets-Sheet 1
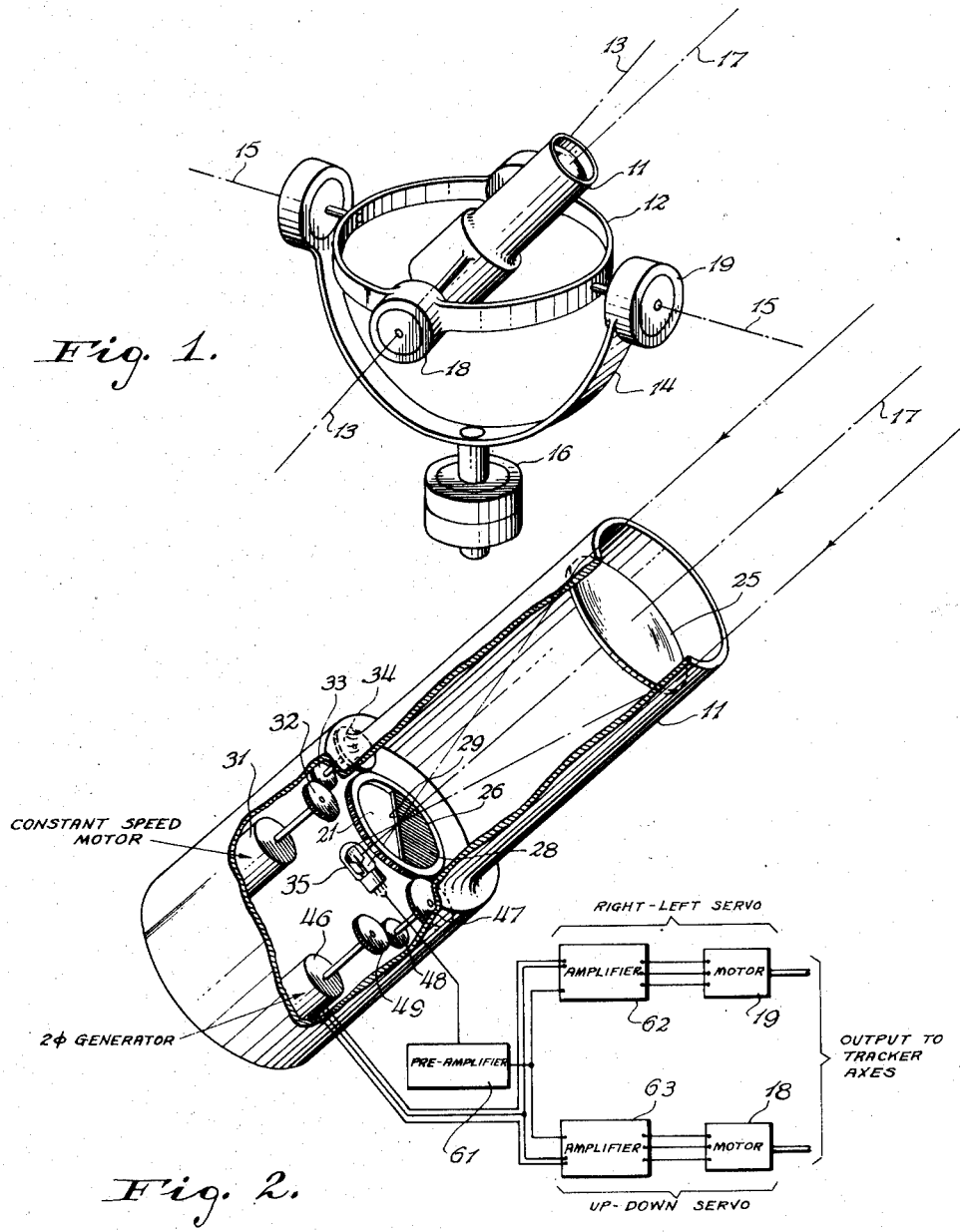
Fig. 1.
Fig. 2.
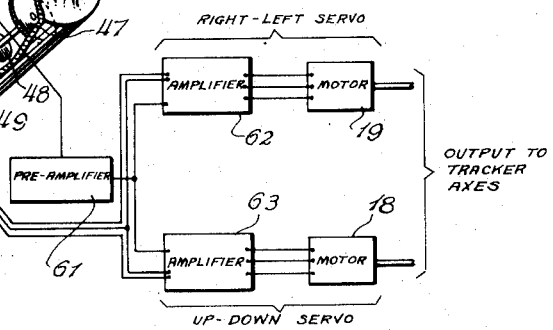
INVENTOR
LARKIN B. SCOTT
BY
Herbert P. Thompson
HIS ATTORNEY July 4, 1950 — L. B. SCOTT — 2,513,367
RADIANT ENERGY TRACKING APPARATUS
Filed May 26, 1948 — 2 Sheets-Sheet 2

INVENTOR
LARKIN B. SCOTT
BY
Herbert P. Thompson
HIS ATTORNEY

Patented July 4, 1950

2,513,367

UNITED STATES PATENT OFFICE 2,513,367

RADIANT ENERGY TRACKING APPARATUS

Larkin B. Scott, Sea Cliff, N. Y., assignor to The Sperry Corporation, Great Neck, N. Y., a corporation of Delaware Application May 26, 1948, Serial No. 29,399

18 Claims. (Cl. 250—203)

This invention relates to a radiant energy tracking apparatus and particularly concerns a device for tracking celestial objects, such as stars.

The apparatus of the instant invention is particularly adaptable for use in a navigation system, such as is disclosed in a copending application S. N. 29,398, filed on even date with the present application in the names of Schultz, Scott and Wing, and entitled "A Navigation System." In the application referred to, the star tracking feature of the present invention is employed in a monitoring capacity for use in conjunction with a space stabilized element.

A prime object of the instant invention is to provide means for producing output signals that are responsive to deviations of a particular line from a predetermined direction, wherein the direction is established with reference to a removed source of radiant energy such as a star or other celestial object.

A further object is to provide a system for producing signals responsive to deviation of a line in space from a predetermined line of sight.

Another object is to provide means producing signals responsive to deviations of the optical axis of a telescope from a predetermined line in space.

A still further object is to provide a tracking apparatus employing radiation sensitive devices for producing signals responsive to deviations of an imaged energy field from a predetermined position, wherein unbalanced characteristics or changes in sensitivity of the radiation-sensitive devices will not affect the alignment of the tracker.

A further object of the invention is to provide a tracking apparatus employing radiation sensitive devices for detecting deviations of the apparatus from a predetermined line in space. Further, in the event that the tracking device is directed toward the object to be tracked, it is desired that the radiation-sensitive devices have a zero error signal output and that in the event of a deviation of the tracking device from the object tracked, modulation characteristics of the ouput from the radiation-sensitive devices define direction and magnitude of deviations from alignment.

A particular feature of one embodiment of this invention resides in the productiton of an error signal differing in fundamental frequency from the fundamental frequency of any mechanically induced disturbance, such as may be introduced from sources within the system itself.

Another feature of the instant invention resides in the ability of the tracking apparatus to be employed to track either a source of radiant energy, or an absence of energy in a large field of radiant energy. The latter alternative would arise, for example, in the event it was desired to track an opaque object such as an aircraft, travelling in a bright sky. Thusly, any object may be tracked that is radiating either more or less energy than the field of the background.

Other objects and advantages of this invention will become apparent as the description proceeds.

In the drawings:

Fig. 1 illustrates the telescope of the instant invention mounted to be pivotable about a plurality of axes;

Fig. 2 illustrates details of one embodiment of the instant invention employing a rotating disk;

Figure 3A:
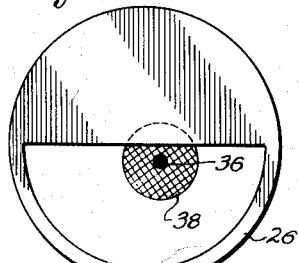
Figs. 3a and 3b illustrate the field of the image produced by the apparatus of Fig. 2, in relation to the rotating disk.

While the description herein considers the instant invention as applied to the problem of tracking a celestial object such as a star, it is to be understood that the principles disclosed apply equally well where the tracking problem involves the tracking of any other source of radiant energy.

Also, if the object desired to be tracked radiates energy less intense than the field surrounding it, the apparatus of the instant invention may be nevertheless employed by reversing the sense of the error signals produced.

Referring to Fig. 1, a telescope 11 is illustrated as being mounted in gimbal 12 to be pivotable about the axis 13, and gimbal 12 is in turn pivotable in the gimbal 14 about the axis 15. A third degree of freedom is provided for the telescope by providing pivotable means for the gimbal 14 enabling rotation of the entire system about the shaft actuated by motor 16. Provision for rotating the entire gimbal system about the shaft actuated by the motor 16 is not disclosed herein since such rotation is not required for the purposes of the present invention.

In a manner to be described, correction signals may be obtained from the apparatus and these signals may be employed to position the telescope 11 to maintain the optical axis 17 in alignment with the direction of radiation of energy of the celestial object and this desired alignment may be obtained through proper excitation of the servo motors 18 and 19.

Telescope 11, including an objective 25, is shown herein as a focusing means for producing an image (either detailed or approximate) of a removed source of radiant energy. If the source of radiant energy desired to be tracked is centered on the axis 17, and if the objective 25 be properly positioned, images of that energy source will be formed on the focal, or reference, plane. However, the reference plane need not be located at the focal plane of the objective, any other position being satisfactory. In the event that the reference plane is not positioned at the focal plane, only the sensitivity of the system will be affected. In order to divide the energy contained in the produced images, disk 26 is provided and this disk comprises two sections; one section 21 being clear and the second section 28 being opaque. In the instant embodiment, the line dividing the clear section 21 from the opaque section 28 is illustrated as being a straight line. However, whatever form, curved or angular, that the line takes, the only requirement is that it pass through the axis 17. The dividing line between the opaque and transparent portion need not describe a sharp division between the portions, the demarkation may be a gradual one such as might be produced if the line were a shaded area gradually progressing from a light shading to a very dark shading. A constant speed motor 31 acting through the gears 32, 33, and 34 is mounted to rotate disk 26 about the axis 17. Radiation sensitive means, in this instant comprising a photo-electric cell 35, is positioned behind the disk 26. In effect, successive portions of the segments created by the dividing means, or disk 26, are cyclically transposed about the principal axis 17, and are transmitted to the radiation sensitive means 35. If any radiant energy appears at the focal or reference plane so as to constitute an image of the removed radiant energy source which is centered about the axis 17, radiation sensitive device 35 will receive a constant portion of this energy and its output will therefore be unmodulated. This is true, whether the image is an actual point or is a disk of light having finite diameter, since successive positions of the rotatable disk always mask equal portions of the image so long as the image is centered with respect to the axis of rotation.

In the event that the tracker assembly be removed to a new direction such that the image is no longer centered about axis 17, the radiation sensitive device 25 will receive a varying portion of this energy, and its output signal will therefore be modulated. This modulation will be a result of the fact that the opaque section of the disk will mask the object image unequally at various points of rotation.

Figure 3B:
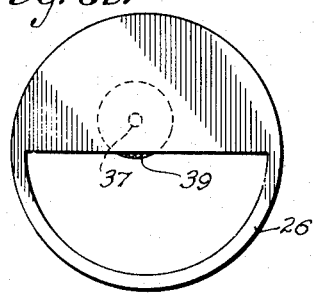

Considering next the relation between the output of the sensitive element as a function of disk rotation, Figs. 3a and 3b illustrate two positions of the image relative to the disk 26, each position being removed from a centered position relative to the axis of rotation of the disk. The output of the photo-electric cell as a function of disk rotation is set forth in Fig. 4. The line 41 illustrates output that the photo-electric cell would have if the image were a point 36 and were displaced, as illustrated in Figure 3a from the axis 17. The curve 42 illustrates a shift in phase of the photocell output for a similar displacement in a different direction from the optical axis, or the axis of rotation of the disk 26, as illustrated in Fig. 3b by point 37. If the area of the image becomes larger as illustrated by the circle 38 in Fig. 3a, the photo-electric cell output will assume the shape of the curve 43. A displacement of the circular image 39 in the direction indicated in Fig. 3b, is illustrated by the curve 44, and it is evident that both a shift in phase and a change in amplitude occurred.

From the above, it may be seen that the phase difference in the signals is a result of the star images lying off the center of rotation in different directions. In other words, the rotating disk's act of masking and unmasking occurs at different points in time for the two images described herein. Further, the two images are not deflected in the same direction from the center of rotation, and, therefore, the phase of the photocell output signals with respect to some fixed reference conveys information as to the direction which the image has been displaced. Similarly, as it was seen that the output curve 43 had larger amplitude as a result of the larger displacement of the image from the axis of rotation, than did the curve 44 which resulted from a smaller displacement, the amplitude of the output voltage is a measure of the deflection from the optical axis.

In order to provide proper reference, a generator 46 is arranged to be driven by the gears 47, 48 and 49 and to have two alternating output voltages whose phase angles are separated by 90° but fixed with respect to the angular position of the disk 26. By supplying the photocell output to the amplifier 61 and comparing the amplified output with the reference voltages generated by the generator 46 in the amplifiers 62 and 63, which amplifiers are of the type employing phase sensitive detectors in their input circuits, servomotors 18 and 19 may be properly activated, one causing rotation of the telescope 11, about the axis 13, and the other causing rotation of the telescope 11 about the axis 15. It is in this manner that the telescope 11 may be maintained in alignment with the celestial object.

In the embodiment just described, all of the information for directing the tracker about its axes of support is obtained from a single photoelectric cell, and the problem of matching sensitivity characteristic of photocells is excluded. Since changing characteristics of the photoemissive element effects only the sensitivity of the system, nothing affecting the shift of the null point will be experienced, the direction to which the tracker will point to a given source is defined by the physical elements of the mechanical components alone.

Figure 4:
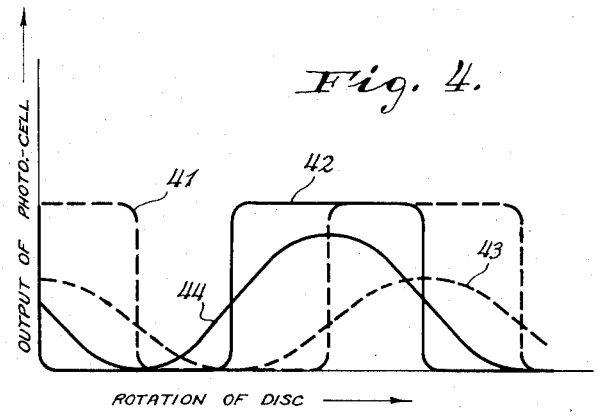
Fig. 4 illustrates amplitude and phase characteristics produced by the image for the positions indicated by Figs. 3a and 3b.
Figure 5:
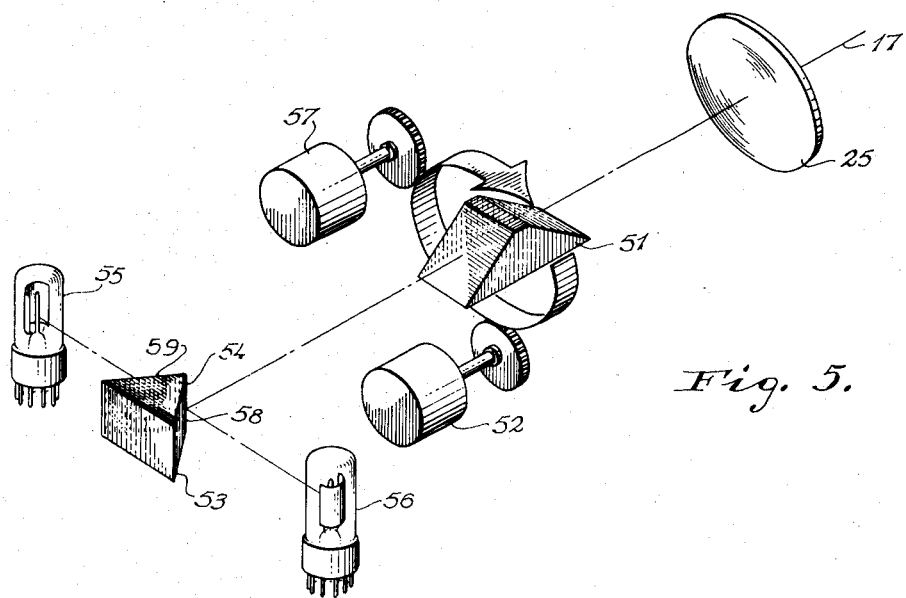
Fig. 5 illustrates an alternative embodiment of the instant invention employing a rotating reversion prism.

An alternative embodiment, illustrated in Fig. 5, produces a signal similar to the type illustrated in Fig. 4. However, whereas in the embodiment first described herein, the image of the radiant energy source was focused on a disk which was then rotated to produce the signal, the present embodiment alternatively rotates the field of the image while holding the disk stationary. Any optical means, such as reversion prism 51 of the type generally known in the art as a "Dove" prism, may be placed in the focal axis of the telescope objective 25 and caused by means of the motor 52 to rotate at a constant speed. The reflecting surface of the reversion prism is made parallel to its axis of rotation and the axis of rotation is aligned with the optical axis 17. A prism 53 having a single knife edge 54 (in this embodiment) located at the focal plane of the telescope objective 25 receives the rotating image, and divides the energy received into a plurality of portions sending a portion to each of the photo-electric cells 55 and 56. While a prism has been herein employed, any means for dividing the energy into two or more portions may be utilized. By transmitting the intelligence received by photo-electric cells 55 and 56 to a push-pull amplifier (not shown) the energy of the entire image is utilized, permitting a maximum efficiency of operation in this respect, thereby greatly increasing the efficiency of the system.

A further advantage of the instant embodiment is obtained since the field of the image is rotated by a reversion prism at twice the speed of rotation of the prism itself and hence the error signal has a frequency twice that of the frequency of the rotating prism. This serves to eliminate irregularities in the error signal which might originate from mechanical motion of the system. Notwithstanding the fact that the image is rotated at twice the rate of rotation of the prism, any astigmatic condition imposed by the prism nevertheless is rotated at the rate of the prism. Astigmatization of the image, therefore, does not result in creating a spurious error signal.

Reference generator 57 arranged to rotate with the reversion prism 51, may be employed to provide a reference signal for determining the actual phase angle and amplitude of any displacement of the image from the focal axis 17.

If the source of radiant energy under observation does not lie on the axis 17, then prism 51 displaces the image in the same way that it would be displaced if it were simply deflected from the base of the prism. As the prism 51 rotates, the image describes a small circle about the axis and the image falls alternatively on the sloping faces 58 and 59 respectively during each half of its revolution. A larger displacement has the effect of increasing the radius of the circle described by the star image.

In the system proposed herein any non-linearity in the relation of the signal to the displacement effects only the ratio of the signals to total displacement, while the phase difference between signal and reference voltages continue to give a true indication of direction of the displaced image.

While the correction signals produced by the radiation sensitive devices have been illustrated as arranged to excite servomotors 18 and 19, to position the telescope 11, these signals may also be employed for other purposes, such as to activate gyro torquers, the latter case being more fully described in the aforementioned copending application.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In a tracking apparatus, means creating an image of a remote energy source at a reference plane, means dividing said image about dividing lines into a plurality of segments, radiation sensitive means for receiving the energy in at least one of said segments, and means causing relative rotation between said image and said dividing means about an axis perpendicular to said reference plane and including a point on said dividing lines, said radiation sensitive means having a phase sensitive output responsive to the direction of deviation of said image from said axis.

2. In a tracking apparatus, means producing an image of a remote energy source at a reference plane, means dividing said image into plural portions, radiation sensitive devices for each of said portions, and means causing relative rotation between said image and said dividing means about an axis perpendicular to said reference plane and including a point separating said plural portions.

3. In a tracking apparatus, focusing means producing an image of a remote energy source at a reference plane, means dividing said image into a plurality of portions, means rotating said image about an axis perpendicular to said reference plane, and radiation sensitive means for receiving energy from said image, said radiation sensitive means having a constant output when said image is centered relative to its axis of rotation.

4. In a tracking apparatus, focusing means for creating an image of a remote energy source, means dividing the energy of said image into a plurality of portions, a radiation sensitive device for each of said portions, and means causing relative rotation between said dividing means and said produced image, said radiation sensitive device being so constructed and arranged as to be productive of an output voltage having a phase sense and amplitude responsive to direction and magnitude of displacement of said produced image from a centered position relative to the focal axis of said first mentioned means.

5. In a tracking apparatus, focusing means creating an image on a reference plane of a remote source of radiant energy, means dividing said image into a plurality of portions, means producing relative rotation between said dividing means and said image about the focal axis, and radiation sensitive means for said received energy for producing a signal voltage output having a phase sense and amplitude responsive to direction and magnitude of displacement respectively of said image from said focal axis.

6. A tracking apparatus for maintaining a principal axis of a positionable object directed toward a source of radiant energy comprising, means concentrating received radiant energy at a reference plane to create an image thereat, means dividing the image created into a plurality of portions, radiation sensitive means arranged to receive at least one of said portions of energy, means causing relative rotation between said image and said dividing means about said principal axis, said radiation sensitive device having a constant output when said rotated portion is centered relative to said principal axis, and having a modulated output reflecting both extent and direction of deviations of said rotated portion from said principal axis, and reference means for said modulated output providing a basis for computing the extent and direction of said duration.

7. In an apparatus for causing a positionable device to remain directed toward a discontinuity in a radiant energy field, focusing means creating an image of the radiant field on a reference plane, an image of said discontinuity being centered on the focal axis when the device is directed toward the discontinuity in the energy field, means arranged to receive said field and divide it into a plurality of portions, means producing relative rotation about said focal axis between said field and said dividing means, and radiation sensitive means for at least one of said portions having a modulated output with a phase sense responsive to the direction of deviation of said image from said axis.

8. In the combination of claim 7 means producing a reference output responsive to rotation of position of said rotating field, and means combining said reference output with said modulated output to produce output signals responsive respectively to direction and amount of said deviation.

9. In the combination of claim 7 radiation sensitive means for each of said field portions.

10. In an apparatus for positioning a device to be directed in accordance with the direction of emanation of radiant energy from a remote source, said direction of emanation being defined by radiation characteristic differences, means creating approximate images of said source at a reference plane, means dividing the area of said reference plane containing said approximate images into a plurality of segments, radiation sensitive means responsive to differences of radiation characteristics as received, and means for producing relative rotation between said image and said dividing means about an axis generally normal to said reference plane, said axis also including the division line between said image areas, said radiation sensitive means being arranged to receive some energy from all sources within the field of reception after an exposure interval at least equal to one period of relative rotation.

11. In a tracking apparatus, means creating an image of a remote energy source at a reference plane, means dividing said image into a plurality of segments disposed about principal axis, means cyclically transposing succesive portions of said segments about said principal axis, and radiation sensitive means for receiving the energy of said segments.

12. In a tracking apparatus, means creating an image of a remote energy source at a reference plane, means dividing said image about lines of division into a plurality of segments, said segments being disposed about principal axis, means cyclically transposing successive portions of said segments about the intersection of said principal axis and said lines of division, and radiation responsive means for receiving the energy of said segments.

13. In an apparatus for causing a positionable device to be oriented with respect to the direction of propagation of radiant energy emanating from remote sources and wherein the particular direction desired may be defined as that direction from which radiant energy arriving at said device possesses radiation characteristics which are uniquely different from the characteristics of radiation arriving at the device from all directions adjacent to but other than said desired direction, means for creating approximate images of said remote sources at a reference plane, means dividing the area of said reference plane containing said approximate images into a plurality of portions, at least one radiation sensitive device arranged to give an indication of said difference in radiation in response to received energy associated with said images which lie within one of said portions of said reference plane, and means for producing a relative rotation between the configuration of said images and said dividing means, said relative rotation taking place about an axis generally normal to said reference plane and including the division lines between said portions, thereby allowing said radiation sensitive means to receive some energy from all sources within the field of reception after an exposure interval at least equal to one period of said relative rotation.

14. The apparatus of claim 13 further including servomotor means connected to respond to the indications produced by said radiation sensitive devices to thereby position said positionable device to be directed toward the source of radiant energy.

15. The apparatus of claim 6 further including servomotor means arranged to receive the output from said radiation sensitive means to thereby maintain said principal axis directed toward said radiant energy source.

16. A radiant energy tracking apparatus comprising, means creating an image of a remote energy source at a reference plane, means dividing said image into a plurality of portions, means rotating said image about an axis perpendicular to said reference plane, radiation sensitive means for receiving energy from said image, said radiation sensitive means having an output voltage with a phase sense and amplitude corresponding to direction and magnitude of displacement of said produced image from a centered position relative to the focal axis of said first mentioned means, and motor means arranged to receive said output voltage to maintain the focal axis of said first means centered relative to the source of energy.

17. In a tracking apparatus for maintaining a principal axis of a positionable object directed toward a source of radiant energy, the combination of means concentrating received radiant energy at a reference plane, a rotatable disc having a diameter dividing an opaque portion from a clear portion, means rotating said disc about said principal axis, and a radiant energy sensitive device having a signal output with a phase sense and magnitude proportional to the direction and extent of displacement of said principal axis from the direction of said source.

18. In a tracking apparatus for maintaining a principal axis of a positionable object directed toward a source of radiant energy, the combination comprising means concentrating received radiant energy at a reference plane, a rotatably mounted reversion prism located intermediate said concentrating means and said reference plane and arranged to be rotatable about said principal axis, a prism having a knife edge mounted at the focal plane of the concentrating means and dividing the energy received into a plurality of portions, and a plurality of radiant energy sensitive devices for receiving each of said portions of radiant energy.

LARKIN B. SCOTT.

REFERENCES CITED

The following references are of record in the file of this patent:

UNITED STATES PATENTS

| Number | Name | Date |
|---|---|---|
| 2,369,622 | Toulon | Feb. 13, 1945 |
| 2,397,933 | Fowle et al. | Apr. 9, 1946 |

FOREIGN PATENTS

| Number | Country | Date |
|---|---|---|
| 352,035 | Great Britain | June 22, 1931 |

Certificate of Correction

Patent No. 2,513,367                                 July 4, 1950

LARKIN B. SCOTT

It is hereby certified that error appears in the printed specification of the above numbered patent requiring correction as follows:

Column 1, line 50, for "productiton" read *production*; column 7, lines 36 and 45, after "about" insert *a*;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*